(12) United States Patent
Asay

(10) Patent No.: US 8,317,230 B2
(45) Date of Patent: Nov. 27, 2012

(54) METHOD OF LABELING A PACKAGE FOR SHIPMENT

(76) Inventor: Jon L. Asay, Farmington, UT (US)

( * ) Notice: Subject to any disclaimer, the term of this patent is extended or adjusted under 35 U.S.C. 154(b) by 6 days.

(21) Appl. No.: 10/326,305

(22) Filed: Dec. 23, 2002

(65) Prior Publication Data

US 2003/0085565 A1      May 8, 2003

Related U.S. Application Data

(62) Division of application No. 09/841,627, filed on Apr. 23, 2001, now abandoned.

(51) Int. Cl.
*B42D 15/00*      (2006.01)
*B65D 65/28*      (2006.01)
*G09F 3/00*       (2006.01)

(52) U.S. Cl. ............................. 283/81; 428/43
(58) Field of Classification Search ............ 283/81; 428/43

See application file for complete search history.

(56) References Cited

U.S. PATENT DOCUMENTS

| | | | | |
|---|---|---|---|---|
| 3,221,427 A | * | 12/1965 | Kaplan | 283/81 |
| 3,535,409 A | * | 10/1970 | Rohde | 428/43 |
| 4,298,647 A |   | 11/1981 | Cancio et al. | |
| 4,309,468 A | * | 1/1982 | St. Aubin | 428/42.3 |
| 4,465,729 A | * | 8/1984 | Cancio et al. | 428/167 |
| 4,720,408 A | * | 1/1988 | Sing | 428/43 |
| 5,031,939 A | * | 7/1991 | Webendorfer et al. | 283/81 |
| 5,422,744 A | * | 6/1995 | Katz et al. | 359/2 |
| 5,449,201 A | * | 9/1995 | Miller et al. | 283/81 |
| 5,618,064 A | * | 4/1997 | Main | 283/80 |
| 6,213,518 B1 | * | 4/2001 | Raming | 283/67 |

FOREIGN PATENT DOCUMENTS

DE       3619466      * 12/1987

\* cited by examiner

*Primary Examiner* — Dana Ross
*Assistant Examiner* — Kyle Grabowski
(74) *Attorney, Agent, or Firm* — Snell & Wilmer L.L.P.

(57) ABSTRACT

A method of labeling a package for shipment includes: providing a shipping label having a generally laminar body with a designated tear path matrix extending over at least a major portion thereof, the generally laminar body having a face side on which is printed origination, destination and tracking data, and a bottom side to which is applied a pressure-sensitive adhesive surface; and attaching the shipping label to a surface of the package, via the pressure-sensitive adhesive surface on the bottom side of said label, prior to its shipment via a common carrier. The designated tear path matrix may be a pattern of interconnected regular hexagons, or a pattern of intersecting first and second parallel tear lines. The tear path matrix may be formed by through-hole perforations in the label body, by channels in the label body, or by regions of reduced shear strength in the label body.

16 Claims, 6 Drawing Sheets

METHOD OF LABELING A PACKAGE FOR SHIPMENT

This application is a divisional of application Ser. No. 09/841,627 which was filed on Apr. 23, 2001, and which is now abandoned.

BACKGROUND OF THE INVENTION

1. Field of the Invention

This invention relates to labels which are designed so that information printed thereon is protected from inadvertent removal after the label has been applied to a package. More specifically, the invention relates to labels having a plurality of tear paths incorporated therein which prevent the removal of large portions of the label when any part of the label becomes snagged, caught or stuck to another object.

2. Description of the Prior Art

Labels are used for many diverse functions. Product labels are attached to a large variety of consumer goods. Such labels typically identify the manufacturer or the distributor of the item, relevant data such as materials used to manufacture the item, its size, and its price. Descriptive labels are frequently attached to closed shipping containers so that the contents thereof may be ascertained without opening the container. Identification labels are used by all major airlines to identify checked baggage. Shipping labels are widely used by freight carriers such as the U.S. Postal Service, Federal Express, United Parcel Service. Such labels typically specify the shipper, the recipient, package contents, the shipping date, the shipping office, a tracking number and other information used during the shipping and delivery process.

When a label is used to designate the origin, destination and contents of a shipped package, there is typically no redundancy of information on the package. Thus if the label is removed before final delivery, the package will lack sufficient information to guarantee a successful delivery. Even if the package is opened, generally little or no additional information is found inside of the package which can assist in the delivery or return of the package. Moreover, the process of opening each package that has lost its label is time intensive and financially burdensome. For this very reason, many packages become unidentifiable and undeliverable during the shipping process. The major freight carriers have entire warehouses dedicated to the storage of undeliverable packages. Although every reasonable attempt is made to determine the shipper or the intended recipient, much of this undeliverable merchandise is eventually disposed of by the freight carriers through auctions or distress sales.

Several decades ago, sodium silicate (a water-soluble compound) was commonly used to apply paper labels to paperboard containers. It is still used in the manufacture of corrugated paperboard containers as an interlayer adhesive. The advantage of using sodium silicate as an adhesive is that once the moisture has evaporated from the solution, the label essentially becomes an integral part of the paperboard container. The disadvantages of using sodium silicate as an adhesive for labels is that the sodium silicate must be applied as an aqueous solution. Until the solution has dried, the label is easily removed. In addition, both the sodium silicate solution and an applicator for the solution must be available when the label is applied.

Today, sodium silicate is seldom used as a label adhesive. Modern labels are generally fabricated from a laminar sheet of printable material such as paper or a polymeric "plastic" compound. Shipping information is typically printed in human readable form, in machine-readable form, or in both forms on a top surface of the laminar sheet. The bottom surface of the label is typically coated with a layer of pressure-sensitive adhesive. Most pressure-sensitive adhesives in use today are manufactured from synthetic rubbers and other synthetic polymers. There are several advantages and several disadvantages related to the use of pressure-sensitive labels. The advantages are that they are easily applied, not only to paperboard containers, but to unpackaged plastic, rubber, and metal items as well. In addition, no messy solution or special applicators are required. of to adhere the various layers to one another. The first disadvantage of pressure-sensitive adhesives is their temperature sensitivity. Pressure-sensitive labels are best attached at high temperatures and shipped at low temperatures. The higher the temperature, easier it is to both apply an remove a label having a backing of pressure-sensitive adhesive. The most significant disadvantage of pressure-sensitive adhesives is that the adhesive never sets up. In other words, it is permanently sticky. Improper application of a label to a shipped item can become a real problem. If the label is not completely adhered to the shipped item, an unadhered portion of the label can be bent away from the item and attach itself to anything with which it comes in contact, including conveyor systems, delivery vehicles, delivery personnel, and even the labels of other packages. In warm weather, the entire label could easily be removed from the shipped item or package. If the label is damaged or removed from the package during transit, proper delivery is hindered and perhaps becomes impossible.

A label is subjected to various situations that may damage the label, render it unreadable, tear a portion of the label off the package and/or tear the entire label from the package. Additionally, many shear forces are applied against the label throughout the label's shipping process. Some of these shear forces will commence as a force perpendicular to the label that becomes an angular force before the force terminates. Other shear forces may be applied because a portion of the label becomes adhered to a stationary item such as a part of the conveyor belt along the shipping pathway. This latter situation may also involve the adhesion of the label of one package to another package. Whether the label is torn away from the package or the label is torn apart will largely be determined by the action that requires the least energy. The action which occurs is the action that exerted the least resistance relative to the shear force and the label against which it was applied.

In an attempt to prevent accidental damage or loss of the label, labels have heretofore been constructed of a uniformly thick, tear-resistant impermeable polymeric film. A label constructed in such a manner may be durable and tear resistant, but presents two additional concerns. First, these labels inadvertently facilitate the complete removal of the label from the package. This undesirable result is thought to occur because, where a particular shear force applied against a weaker label might simply tear it, the same shear force, when applied against a label made of stronger, more uniform material, will remove the entire label from the shipped item or package. Secondly, because the label is an impermeable solid sheet, pockets of air may be trapped between the label and the package during its application to the package. The air prevents the complete adhesion of the label to the package, rendering its removal easier than if the label were completely adhered to the package.

Several shipping label styles of the prior art have enclosed the shipping label in a plastic envelope or pocket which is attached to the package, to prevent damage to the label during shipping. However, though this approach may protect the label from damage, it also serves to facilitate the complete removal of the envelope or pocket, along with the intact, undamaged shipping label, from the package.

An additional style of label in the prior art increased the surface area of the label, including an increase in the area of the pressure sensitive adhesive layer. Apparently, it was perceived that through the increase in the surface area of the adhesive layer, that stronger adhesion of the label to the package would be accomplished and, thus, it would be more difficult to remove any portion of the label. However, a natural consequence of the increased surface area of the label is the increase in the volume of air that must be displaced by the label in order to accomplish adhesion to the package. The increased surface area of the label often resulted in decreased adhesion of the label because of the trapped air between the label and the package, which prevented complete adhesion of the label. Instead of providing a label that resisted inadvertent removal, the label was often more easily removed.

Accordingly, there is a need in the art for a label that adheres more tenaciously to the package, minimizes the trapping of air between it and the package during application, and which permits the tearing away of tiny bits of the label which may become snagged during shipment, thereby leaving the remainder of the label intact.

SUMMARY OF THE INVENTION

The present invention solves the aforementioned problems related to shipping labels having pressure-sensitive adhesive backings. In much the same way that a lizard gives up its tail to a potential predator to save its life, the new label is designed as a matrix of interconnected bits, such that any bit may be removed without removing adjacent bits. All embodiments of the present invention are directed to labels that have a matrix of predetermined designated tear paths, each of which describes a pathway of low resistance tearing. This predetermined designated tear path describes a path of decreased tearing resistance and, because a tear will follow the pathway of least resistance, this predetermined designated tear path directs the tear along a determined pathway, rather than a random path across the label.

For a preferred embodiment of the invention, the entire label is provided with myriad, interconnected tear paths. Each bit of the label is completely surrounded by multiple tear paths so that it may be individually removed without removing an adjacent bit. The tear paths may be formed in various ways. A first method is to create a matrix of intersecting, perforated lines through the printable sheet, or body, of the label. A second method is to create a matrix of intersecting score lines on the top surface, bottom surface or both surfaces of the printable sheet or body of the label. A third method is to form the printable sheet in a heat and/or pressure texturizing process so that a matrix of grooves is formed on the top surface, bottom surface, or both surfaces thereof. A fourth method is to form the printable sheet from two different materials of different shear strengths. A spider-web-like matrix of the material having a lower shear strength is embedded within a sheet of material having a greater shear strength. As a general rule, the pressure-sensitive adhesives in use have very little structural strength. For this reason, creating a tear path pattern matrix within the adhesive layer, itself, is not a preferred method. Were the adhesive layer to have significant structural strength, it might also be provided with the matrix of tear paths. For this embodiment of the invention, it is contemplated that shipping and identification information will be duplicated on different portions of the label. Thus, if a bit of information essential to decoding the printed shipping or identification information is mechanically removed from one portion of the label, it will be found on the other portion.

For another preferred embodiment of the invention, the primary data-containing portions of the label is free of tear paths, with only the areas surrounding the primary data-containing portion being provided with a matrix of tear paths. This embodiment of the invention may be used where perforations hamper the reading of bar-code information on the label. However, where information in human readable form is printed on the label, perforations generally do not interfere with the reading of the information. For this embodiment of the invention, it is contemplated that, for maximum shipping security, multiple labels will be attached to the shipping container. Two-dimensional, optically-readable code patterns are capable of storing a great deal of information in a small area. As a backup to the primary data-containing portions of the label, multiple two-dimensional code patterns which encode for the shipping and identification information may be placed on the shipping container. One embodiment of the invention includes at least one such two-dimensional code pattern which can be detached from the primary shipping label before its attachment to the shipping container and attached to the container at a location removed from the attachment site of the primary shipping label.

The energy of a shear force applied to a label is directed by the laws of physics to be expended in one or all of several actions. The shear force will act in the most energetically conservative fashion to the extent of its potential energy. The shear force will cause the energetically most conservative action or series of actions. One of these actions is the tearing of the label. The tear will follow the path of least resistance through the label. The path of least tear-resistance is often a random pathway across the label. The randomness probably occurs because of slight inconsistencies in the strength or thickness of different portions of the printable sheet, or body of the label.

A shear force that might have damaged a label lacking a predetermined designated tear path because of a random tear through the label, or which might have caused the label to be torn from the package, tears along the predetermined designated tear path because this action describes an action of lessor energy expenditure than alternative actions such as tearing along a non-predetermined designated tear path or the removal of the label from the package.

The matrix of predetermined designated tear paths is formed in the label so that any tearing of the label will be minimized and limited to the bits which actually come in contact with a shearing force. The existence of designated tear paths prevents a tear from continuing into the primary data portion of the label if the shear force does not act on that portion.

In the context of this disclosure, a "predetermined designated tear path" means a path of lower tear resistance than elsewhere on the label. The path of lower tear resistance may or may not be visible to the naked eye, and describes a pathway across the label where the energy required to tear the label is less than the energy required to tear portions of the label were no tear path exists.

Where the designated tear-path is described by perforations or holes through the printable sheet, or body of the label, each hole, which extends from the top surface of the sheet to the bottom surface thereof, is one portion of a designated tear path. A designated tear path is defined by a theoretical line which interconnects each hole with one or more other holes adjacent thereto. A tear which follows this designated tear path will proceed along a path of lesser tear resistance than if the tear had proceeded through the main body of the label.

Where the designated tear path is described by a different, more easily torn material, the material has been interspersed with the main label material so as to define a spider-web-like design of more easily torn composition and main label material surrounding, on the plane, the data-containing portion of the label.

Where the designated tear path is described by a series of interconnecting channels, these channels may be on either the top or bottom surface, or perhaps on both surfaces. This design would provide designated tear paths defined by the channels in the surface of the label.

DETAILED DESCRIPTION OF THE INVENTION

Accordingly, one aspect of the invention is directed to a label comprising a designated tear-path. This printable sheet, or body, of the label has a top and a bottom surface. The bottom surface may be a pressure sensitive adhesive and the top surface may have one or more data containing portions.

Figure 1:
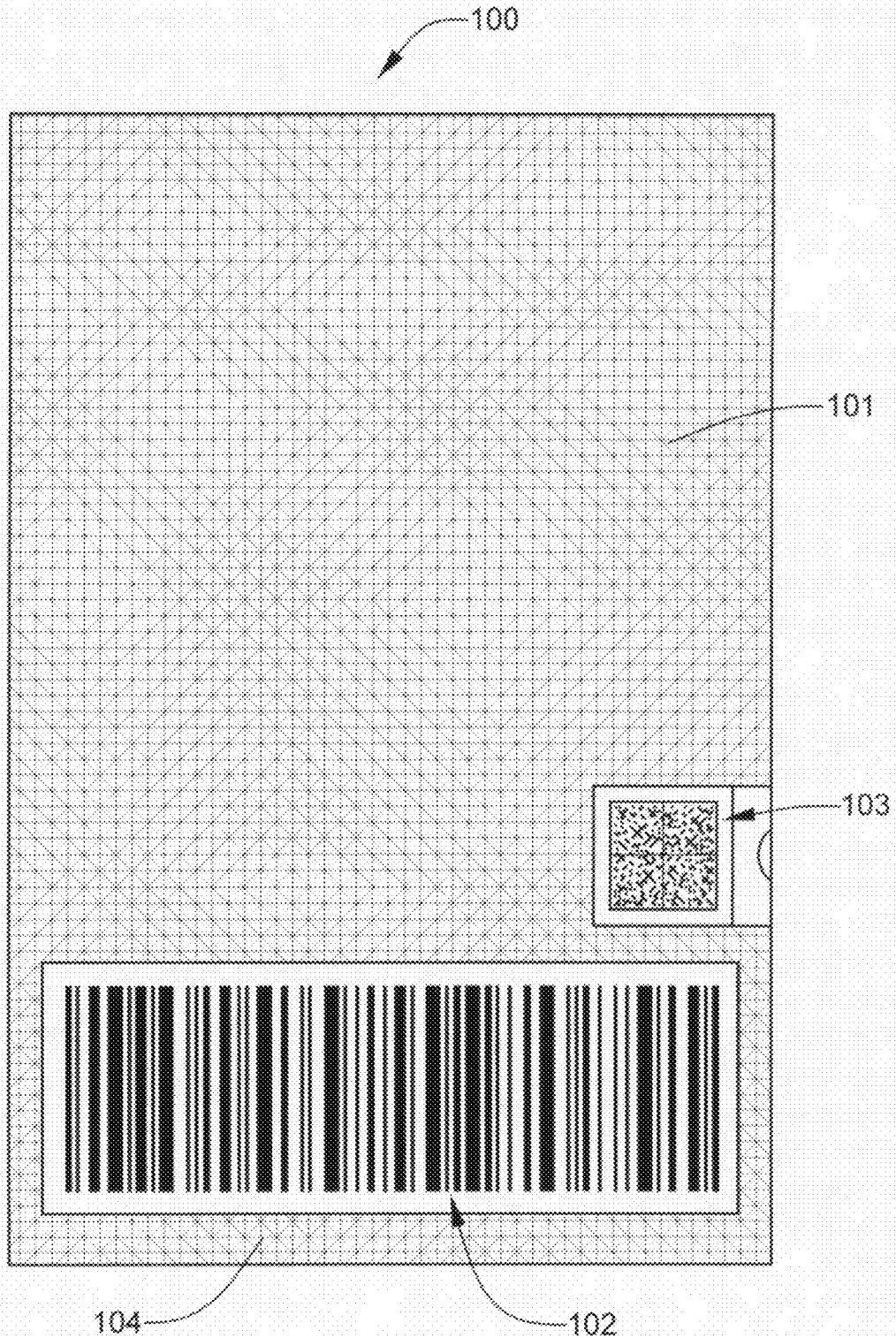
FIG. 1 is a top planar view of a first embodiment of a tear-away label having a ⅛-inch tear path grid.

Referring now to FIG. 1, a shipping label 100 constructed in accordance with the present invention includes a blank region 101 on which can be printed human-readable information in the form of alphanumeric characters, a bar-coded region 102, and a single two-dimensional, optically-readable code pattern 103 positioned in the lower right-hand corner of the blank region 101. It is intended that code pattern 103 encodes sufficient information to identify the shipment in the event that the bar coding in the bar-coded region 102 is damaged to the extent that it becomes undecipherable. The label 100, which is shown approximately to the intended scale, employs a ⅛-inch tear path grid within the blank region 101 and in a border 104 which surrounds three sides of the bar-coded region 102.

Figure 2:
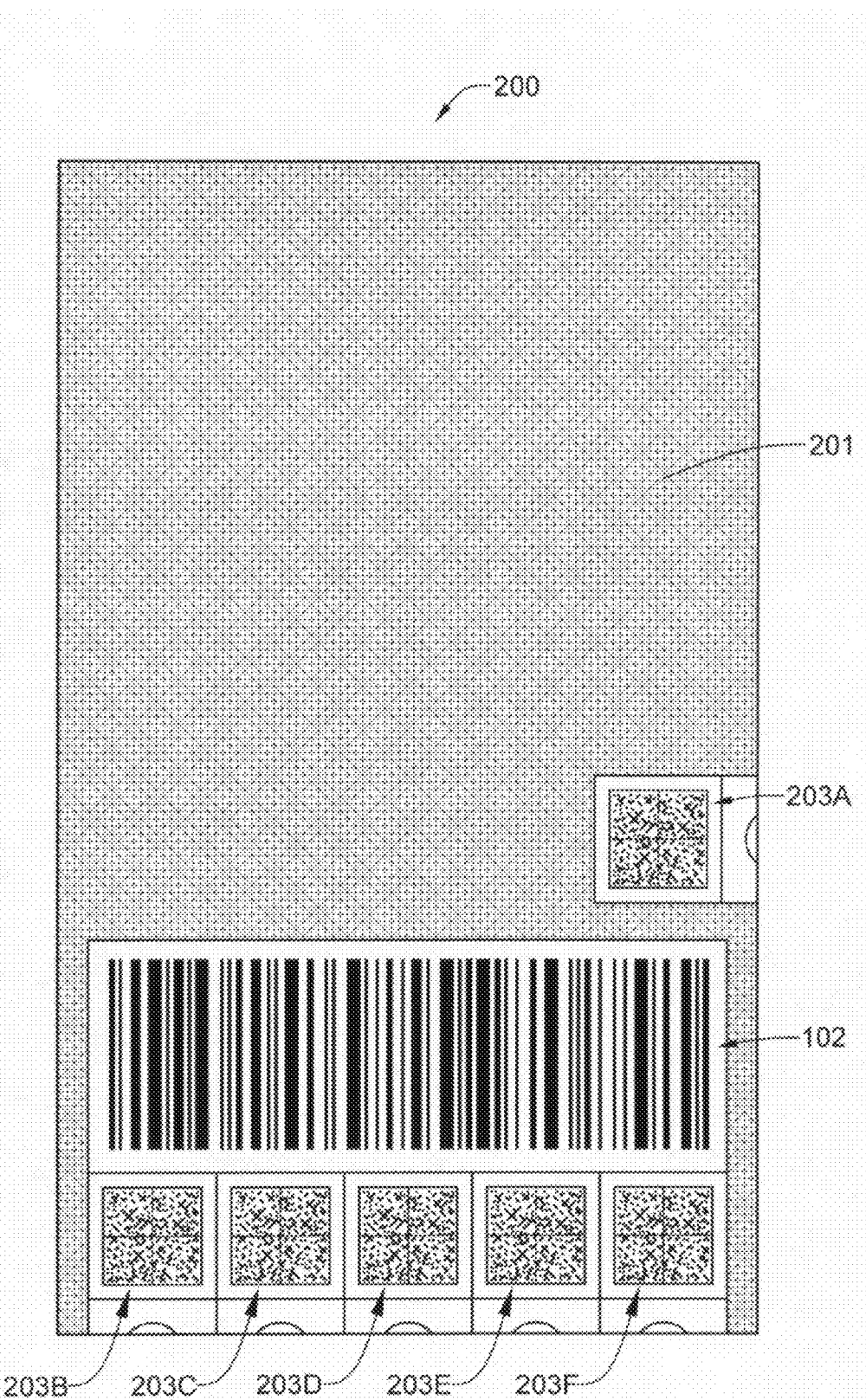
FIG. 2 is a top planar view of a second embodiment of a tear-away label having a 1/16-inch tear path grid and multiple tear-off, relocatable, two-dimensional, optically-readable code patterns.

Referring now to FIG. 2, a shipping label 200 is similar to shipping label 100 of FIG. 1, with the exception that a 1/16-inch tear path grid is employed in the blank region 201, and the addition of five supplemental two-dimensional code patterns 203B, 203C, 203D, 203E and 203F, which are detachable from the primary shipping label so that they may be relocated to different portions of a shipping carton. It is intended that each of the six two-dimensional code patterns 203A, 203B, 203C, 203D, 203E and 203F incorporates sufficient information to identify the shipment.

Figure 3:
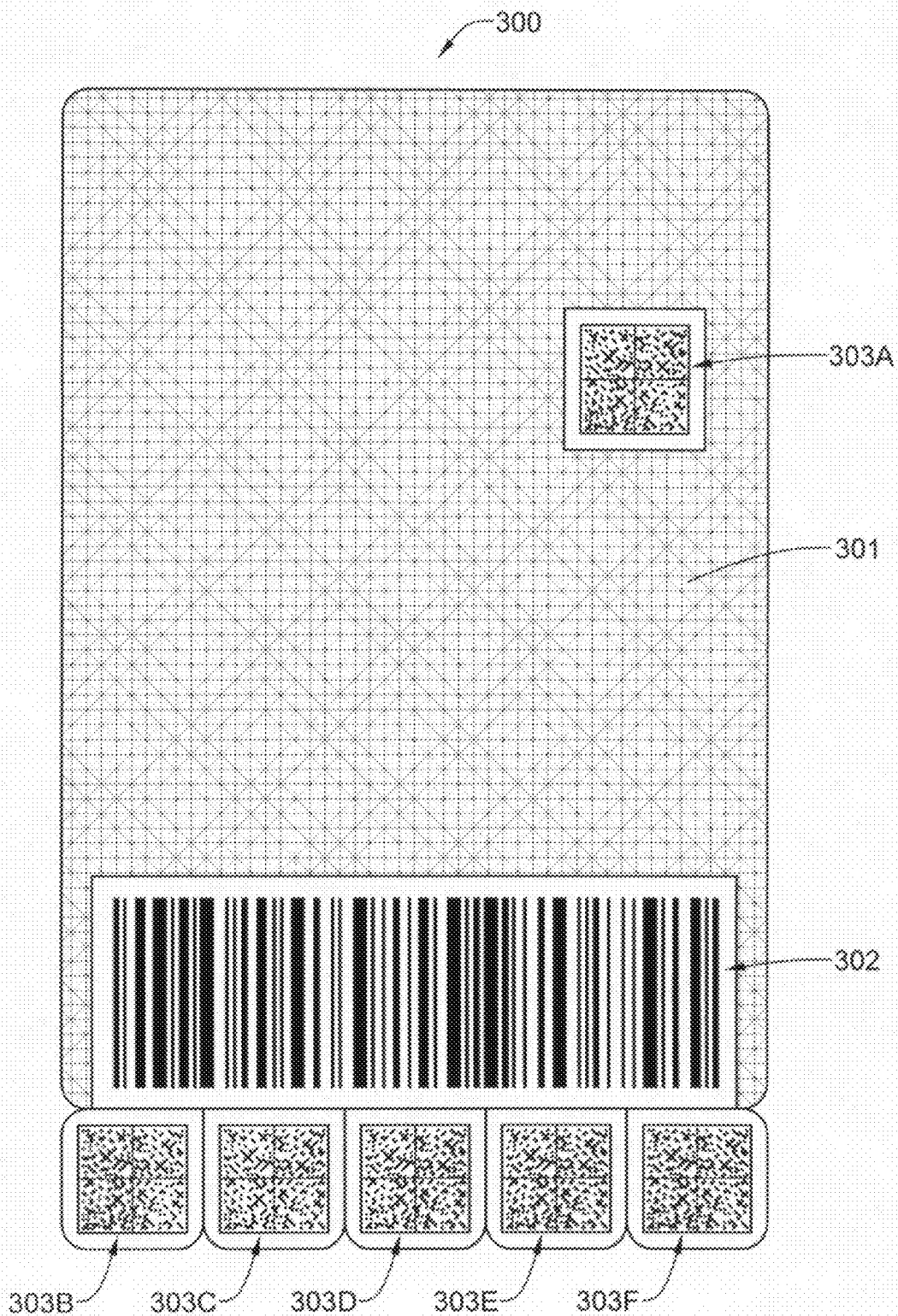
FIG. 3 is a top planar view of a third embodiment of a tear-away label having a ⅛-inch tear path grid, rounded corners, and multiple tear-off, relocatable, two-dimensional, optically-readable code patterns.

Referring now to FIG. 3, a shipping label 300 constructed in accordance with the present invention includes a blank region 201, a bar-coded region 302, and a single six two-dimensional, optically-readable code patterns 303A, 303B, 303C, 303D, 303E and 303F. Of the six two-dimensional code patterns, 303A in printed within the blank region 301 and is intended to remain with the primary shipping label, which includes the blank region 301 and the bar-coded region 302. The five remaining two-dimensional code patterns 303B, 303C, 303D, 303E and 303F are detachable from the primary shipping label so that they may be relocated to different portions of a shipping carton. It is intended that each of the six two-dimensional code patterns incorporates sufficient information to identify the shipment.

Figure 4:
FIG. 4 is a top planar view of the third embodiment tear-away label on which has been printed sample data.

Referring now to FIG. 4, human readable shipping information has been printed within the blank region 301 of label 300, resulting in a completed shipping label 400.

Figure 5:
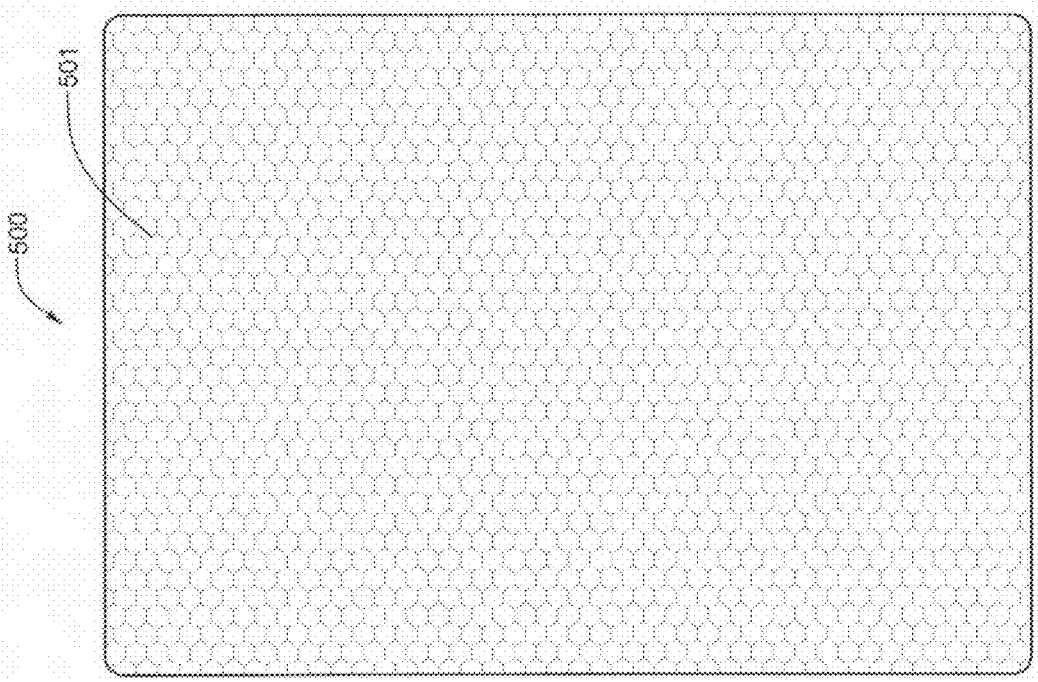
FIG. 5 is a top planar view of an optional honey-comb tear path grid which is usable for the tear-away labels of the present invention.

Referring now to FIG. 5, a blank shipping label having a honeycomb tear pattern over its entire surface is shown. The tear pattern may be formed from perforations, channels, or varied shear strength of materials used to fabricate the label body 501.

Figure 6:
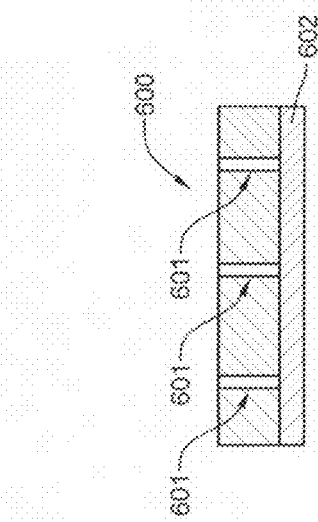
FIG. 6 is a cross-sectional view of a label showing perforated tear paths.

An additional aspect of the invention is directed to a label comprising a top surface and a bottom surface and a designated tear-path and where a plurality of holes communicating between said top surface and said bottom surface, define the designated tear-path. The plurality of holes may be perforations such as used to separate a tear-off section of a coupon or bill. Referring now to FIG. 6, a cross section is shown of a small portion of a label 600 in which through hole perforations 601 are used to form the tear pattern matrix.

Figure 7:
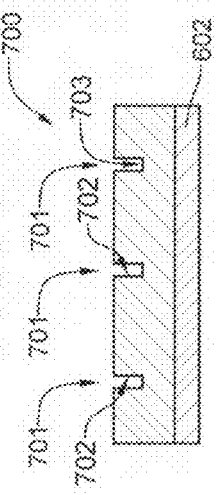
FIG. 7 is a thin-slice view of a label showing grooved tear paths.

An additional aspect of the invention is directed to a label comprising a top surface and a bottom surface and where a plurality of channels are cut in either the top surface or the bottom surface or optionally in both the top and the bottom surfaces and where these channels define designated tear-paths. The channels, if cut only in one of the surfaces, may be of any depth less than the thickness of the label, and where the channels are cut in both surfaces, they may each be individually cut to any depth with the proviso that where any channels on the top surface are coincident with a channel on the bottom surface, that the combined depth of the channels is less than the thickness of the label. Referring now to FIG. 7, a thin-slice section is shown of a small portion of a label 700 in which channels 701 are used to form the tear pattern matrix. It will be noted that each of the channels 701 is square-cut, with the walls 702 thereof forming a right angle with the bottom 703 thereof.

Figure 8:
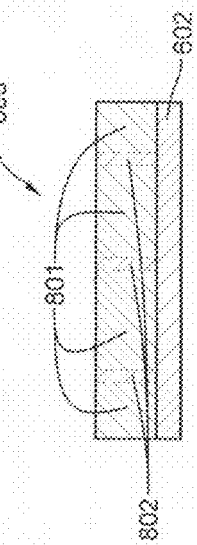
FIG. 8 is a cross-sectional view of a label showing tear paths comprised of material having less shear strength than that of surrounding material.

Referring now to FIG. 8, a cross-section is shown of a small portion of a label 800 in which regions of varied shear strength are employed to form the tear pattern matrix. Regions 801 are made of material having greater shear strength than regions 802.

In FIGS. 6 through 8, the bottom layer 602 of each label 600, 700 and 800 is a pressure-sensitive adhesive layer.

Although the following theoretical explanation should not be viewed as a limitation on the invention, it may serve to assist understanding and the practice of the invention. The label according to the present invention provides many advantages over labels of the prior art through the incorporation of a designated tear path in the label. The designated tear path predisposes the label to function in unique and beneficial ways.

First, the designated tear path defines a path of lesser or decreased tear-resistance than other portions of the label. A shear force of sufficient strength applied to the label will cause the label to tear. In labels of the prior art, the label would tear along a seemingly random path. However, the tear proceeds along a path of least resistance through the label. The designated tear paths provide tear sections of less resistance as compared to other portions of the label. A tear in a label according to the present invention follows the designated tear path because it defines a path of decreased tear resistance as compared to other portions of the label. Moreover, a tear that initiates at an outer edge of the label, at the intersection of a designated tear path with an outer edge, would not tear in a random direction through the label, but would continue to tear according to the designated tear path because the tear path defines a path of reduced tear-resistance as compared to other portions of the label.

When a tear initiates at a portion of the label other than on a designated tear-path, the label will tear in a random direction according to the direction of the force vector until the tear intersects a designated tear path. When the tear intersects a designated tear path, the tear follows the designated tear path because the designated tear path is a path of diminished or lesser tear-resistance as compared to other portions of the label. Each designated tear path directs the tear toward an outer edge of the label. The designated tear paths thereby direct any tear away from the data portion of the label and toward an outer edge.

Additionally, when the designated tear-path is defined as a plurality of holes, perforations, or channels cut into one or both sides of the label, there is less chance of trapping air between the label and the package during application of the label to the package. During the adherence of a label to a package, the bottom or pressure sensitive adhesive side is pressed onto the package to be labeled. To avoid being trapped under the label during the application process, air that is beneath the label passes through the plurality of holes in the label, or along one of the channels cut into the bottom surface. Greater contact between the label and the package is achieved by providing a pathway for the air to easily escape. Greater contact between the label and the package equates to increased adhesion of the label to the package. Through this design, the air is allowed to escape, thereby allowing for a more complete adhesion of the label to the package. Therefore, a label according to the present invention adheres more strongly to the package than labels of the prior art.

Figure 9:
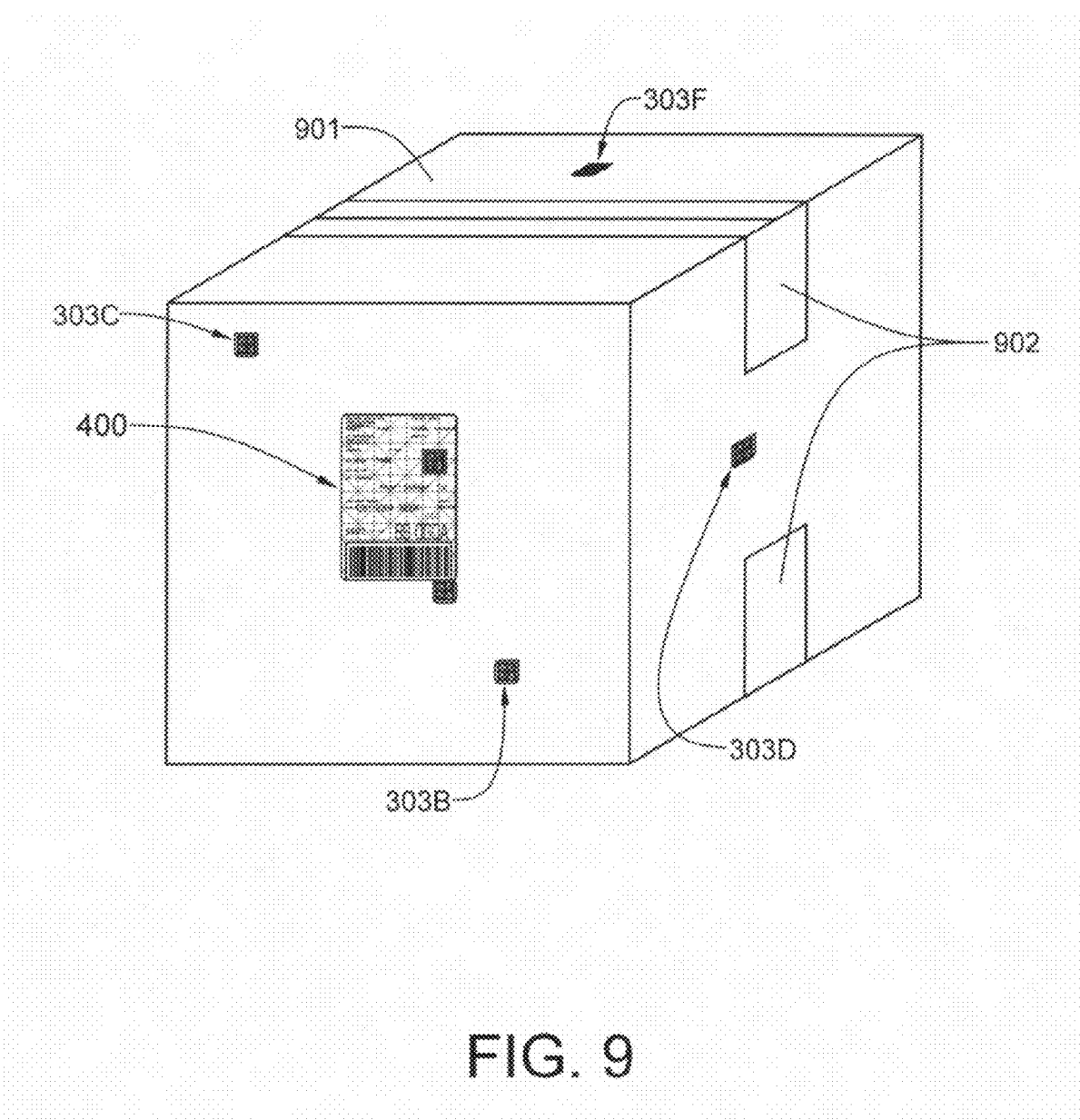
FIG. 9 is a carton for shipment to which has been applied the label of FIG. 4.

Referring now to FIG. 9, a package ready for shipment 901 has had the label 400 applied thereto. The package 901 is a conventional fiberboard container having six generally planar faces. The label is adhered to the package 901 with adhesive backing layer 602 (see FIGS. 6-8). It will be noted that optically-readable code patterns 303B, 303C, 303D, and 303E have been applied to other locations on the package, thereby lessening the chance that delivery information will be obliterated during shipment.

Although only several embodiments of the invention have been described herein it will be obvious to those having ordinary skill in the art that certain modifications and changes may be made thereto without departing from the spirit and scope of the invention as hereinafter claimed.

What is claimed is:

1. A method of labeling a package for shipment, the method comprising:
   providing a shipping label having a generally laminar body with a face side and a bottom side, the body further comprising a first data containing label portion with a designated tear path matrix extending over a major portion of the label, wherein the face side has printed thereon destination and tracking data, wherein the tear path matrix comprises a first square matrix with connected nodes superimposed over a second diamond matrix with unconnected nodes; and
   attaching the bottom side of the shipping label to a surface of the package prior to its shipment via a common carrier.

2. The method of claim 1, wherein the designated tear path matrix comprises at least one of: perforations, cuts, and channels on at least one of the face side and the bottom side.

3. The method of claim 2, wherein the connected nodes superimpose the unconnected nodes.

4. The method of claim 3, wherein the bottom side comprises a pressure-sensitive adhesive layer.

5. The method of claim 4, wherein no tear path matrix is present on a portion of the body where at least one of destination data, tracking data, an alpha-numeric form and a bar-coded form is designated to be printed and wherein the portion is surrounded by the tear path matrix.

6. A shipping label comprising:
   a generally laminar body having a face side, a bottom side and a tear path matrix extending over a major portion of the body;
   the face side of the body has printed thereon at least one of destination data and tracking data;
   wherein the tear path matrix comprises a first tear path matrix of continuos lines superimposed with a second tear path matrix of discontinuous lines.

7. The shipping label of claim 6, wherein the tear path matrix comprises at least one of: perforations, cuts, and channels on at least one of the face side and the bottom side.

8. The shipping label of claim 6, further comprising a pressure-sensitive adhesive layer attached to the bottom side of the shipping label.

9. The shipping label of claim 8, wherein no tear path matrix is present on a portion of the body where at least one of destination data, tracking data, an alpha-numeric form, and bar-coded form is designated to be printed.

10. The shipping label of claim 9, wherein the portion designated for at least of destination data and tracking data is surrounded by a tear path matrix.

11. The shipping label of claim 10, wherein the tear path matrix further comprises a plurality of channels on the bottom side, and wherein at least some of the channels are at least one of sufficiently deep and sufficiently wide to permit air to escape during application through sides of the body.

12. The shipping label of claim 6, wherein the connected nodes superimpose the unconnected nodes.

13. The shipping label of claim 12, wherein the connected nodes are the point at which at least two continuos lines intersect.

14. The shipping label of claim 13, wherein the unconnected nodes are the point at which at least two discontinuous lines would intersect if continuous.

15. A shipping label comprising:
   a generally laminar body having a face side, a bottom side and a tear path matrix extending over a major portion of the body;
   the face side of the body has printed thereon at least one of destination data and tracking data;
   wherein the tear path matrix is defined by a plurality of unit cells, wherein each unit cell comprises an outer square defining four interior squares, and wherein each interior square comprises a diagonal line, wherein the diagonal line does not intersect with the perimeter of the interior square.

16. The shipping label of claim 15, wherein the tear path matrix comprises at least one of: perforations, cuts, and channels on at least one of the face side and the bottom side.

* * * * *